March 8, 1932.  M. W. McCONKEY  1,848,259
BRAKE
Filed Nov. 4, 1929
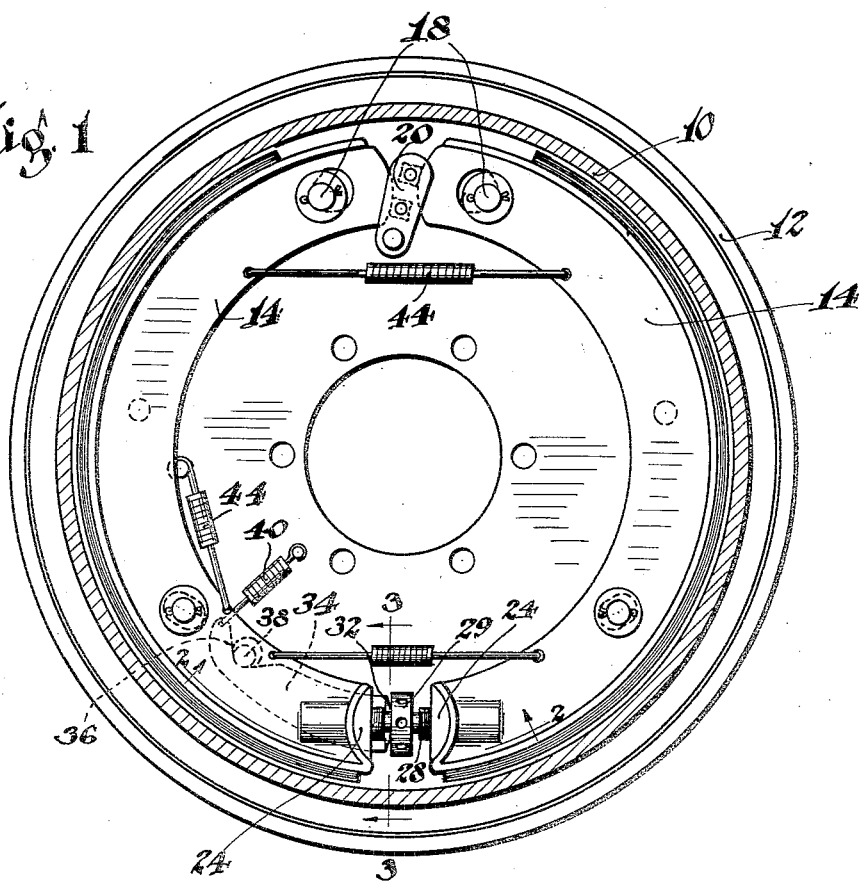
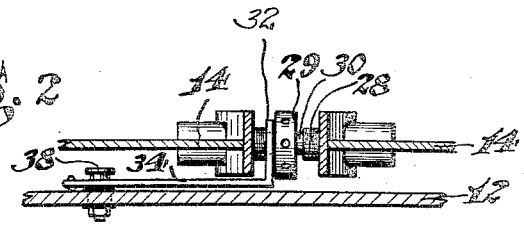
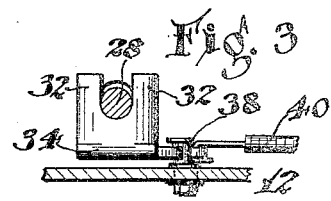
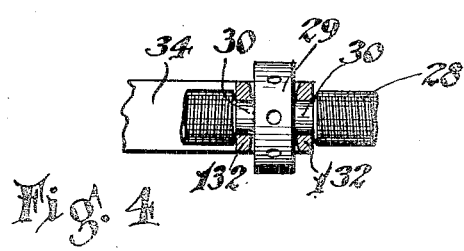
INVENTOR.
M. W. McConkey Patented Mar. 8, 1932

1,848,259

UNITED STATES PATENT OFFICE

MONTGOMERY W. McCONKEY, OF SOUTH BEND, INDIANA, ASSIGNOR TO BENDIX BRAKE COMPANY, OF SOUTH BEND, INDIANA, A CORPORATION OF ILLINOIS

BRAKE

Application filed November 4, 1929. Serial No. 404,576.

This invention relates to brakes and is illustrated as embodied in an internally expanding brake suitable for use on automobiles in which a pair of shoes are pivoted to a screw adjuster at one end and spread apart by an actuator at the other end.

One object of this invention is to provide improved centering means for these brake shoes which does not require adjustment after adjustment of the shoes. The main feature of this invention lies in connecting the centering means with the adjusting screw by means of a fork in a recess, to substantially eliminate play. Thus, as the adjusting screw is turned, it shoves both of the shoes outwardly but itself remains accurately positioned.

In the drawings in which one embodiment of the invention is illustrated:

Figure 1 is a vertical cross sectional view;
Figure 2 is a cross section along the line 2—2 of Figure 1;
Figure 3 is a cross section along the line 3—3 of Figure 1; and
Figure 4 is a detail showing a slight modification of the invention.

The brake mechanism is supported within the brake drum 10 by the backing plate 12. It consists preferably of a pair of brake shoes 14 which are anchored at 18 and are actuated by the cam 20 or any other desired actuator. The two shoes are articulated at the other ends by co-acting with the spaced segments 24 which are adjustably spaced apart by the adjusting screw 28. The segments 24 are semi-cylindrical on their outer sides and co-act with similarly shaped sockets in the shoes so that the shoes are free to pivot about said segments. The screw member 28 is similar to a well known type of adjusting screw having right hand thread on one end and left hand thread on the other end and having a collar 29 at the middle with holes, notches or other means to aid in turning the screw for the purpose of adjustment. As is well known, when the screw is turning in one direction, both of the shoes are forced outwardly, the screw always being equidistant from the two shoes.

I have provided one or more annular recesses 30 in this screw member and have put in one or both of said recesses the arms 32 of the centering member 34. The other end of the member 34 is notched as at 36, said notch co-acting with a fixed or adjustable pin 38 against which it is held by spring 40. Since the screw 28 always remains centered as respects the shoes 14 and since the screw is normally held centered with respect to the drum by centering member 34 and pin 38, it is clear that the shoes 14 are likewise held centered with respect to the drum. When the screw 28 is turned in making adjustments, it remains in the center, as do both of the shoes 14.

The operation of the brake is as follows: The cam 20 spreads apart the brake shoes 14 until one or both of them contact with the drum 10, while the other one is anchored or becomes anchored about its anchor 18. When the shoe 14 contacts with the rotating drum 10, it is rotated with the drum sufficiently to thrust the other shoe against the drum, the thrust being transmitted through screw 28. This, of course, involves a movement of the adjusting screw 28, which moves the centering member 34, thus stretching the spring 40. When the brake is released, the release springs 44 draw the shoes 14 away from the drum and the spring 40 draws the centering member 34 back into its normal centered relation with pin 38, thus centering screw 28 and shoes 14. The desired normal position of the shoes 14 may be initially secured by adjusting pin 38, but no further adjustment of the centering means will be necessary, since in adjustment the shoes are moved equally with respect to the centering means and screw 28.

If desired, the member 34 may be provided with four arms 132 instead of two which may co-act with pin 28 in two different recesses preferably on the two sides of the collar 29. This will have the effect of holding member 34 and screw 28 a little more rigidly together. This modification is shown in Figure 4.

While two illustrative embodiments of my invention have been described in detail, it is not my intention to limit the scope of the invention to those particular embodiments or otherwise than by the terms of the appended claims.

I claim:

1. Brake mechanism including a backing plate, two brake shoes thereon, a right and left hand screw between said shoes, and means anchored on the backing plate co-acting with said screw for centering said screw and said shoes, said screw being restrained from longitudinal movement relative to said means.

2. Brake mechanism including a backing plate, two brake shoes thereon, an adjusting screw between said shoes, and means anchored on the backing plate, co-acting with said screw for centering said screw and said shoes, said screw being restrained from longitudinal movement relative to said means.

3. Brake mechanism including a brake drum, a backing plate, two brake shoes on the backing plate adjacent said drum, right and left hand threaded adjusting means between said shoes, and means anchored on the backing plate through a spring co-acting with said adjusting means and restrained from longitudinal movement thereon to normally hold it in such position that the shoes will be centered with respect to the brake drum.

4. Brake mechanism including a brake drum, a backing plate, two brake shoes on the backing plate adjacent said drum, an adjusting screw extending between said shoes, said adjusting screw always being in centered position with respect to said shoes and means anchored through a spring to the backing plate co-acting with said adjusting screw and restrained from longitudinal movement thereon to normally hold it in such position that the shoes will be held in the desired position with respect to said brake drum.

5. Brake mechanism including a backing plate, a brake drum, two shoes adjacent said brake drum, adjusting means pivotally connected with said shoes, said means comprising a right and left hand screw co-acting with right and left hand threaded segments respectively adjacent said shoes, a recess in said screw, a forked centering member co-acting with said recess and also co-acting with a fixed pin to normally hold such screw in the desired position.

6. Brake mechanism including two shoes spaced apart by a right and left hand screw, said screw having two annular indentations therein, a pair of bifurcations co-acting with each indentation, said bifurcations being attached to a centering member which co-acts with the backing plate to normally hold the screw in the desired position.

7. Brake mechanism including two brake shoes having a floating adjusting device therebetween, a centering member attached to said adjusting device, and having a V-shaped notch normally held centered on an adjustable pin.

8. Brake mechanism including two shoes adjustably spaced apart by an adjusting member having a collar, and so arranged that said shoes approach or recede from said collar equal amounts, said adjusting member having a groove and a member co-acting with said groove to hold the collar in the desired position.

9. Brake mechanism including two shoes adjustably spaced apart by an adjusting member having a collar, and so arranged that said shoes approach or recede from said collar equal amounts, said adjusting member having a groove adjacent said collar, and a member co-acting with said groove to hold the collar in the desired position.

10. Brake mechanism including two shoes spaced apart by an adjusting screw having an annular groove and a yieldable centering member having a single pair of arms, said arms fitting in said groove.

In testimony whereof, I have hereunto signed my name.

MONTGOMERY W. McCONKEY.